(12) United States Patent
Mao

(10) Patent No.: US 7,545,926 B2
(45) Date of Patent: Jun. 9, 2009

(54) ECHO AND NOISE CANCELLATION

(75) Inventor: Xiadong Mao, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 397 days.

(21) Appl. No.: 11/381,728

(22) Filed: May 4, 2006

(65) Prior Publication Data

US 2007/0274535 A1    Nov. 29, 2007

(51) Int. Cl.
*H04M 9/08* (2006.01)
(52) U.S. Cl. ............................. 379/406.08; 379/406.02
(58) Field of Classification Search ............ 379/406.08, 379/406.02
See application file for complete search history.

(56) References Cited

U.S. PATENT DOCUMENTS

| | | | |
|---|---|---|---|
| 5,335,011 A | 8/1994 | Addeo et al. ................... 348/15 |
| 6,173,059 B1 | 1/2001 | Huang et al. ................... 381/92 |
| 6,263,078 B1 * | 7/2001 | McLaughlin et al. ... 379/406.08 |
| 6,426,979 B1 * | 7/2002 | Yang et al. ................... 375/285 |
| 6,834,108 B1 * | 12/2004 | Schmidt ................ 379/406.01 |
| 7,039,181 B2 * | 5/2006 | Marchok et al. ....... 379/406.03 |
| 2002/0041678 A1 * | 4/2002 | Basburg-Ertem et al. ...................... 379/406.01 |
| 2003/0160862 A1 | 8/2003 | Charlier et al. .......... 348/14.08 |
| 2004/0047464 A1 | 3/2004 | Yu et al. ................. 379/392.01 |
| 2004/0161101 A1 * | 8/2004 | Yiu et al. ................ 379/406.01 |
| 2004/0213419 A1 | 10/2004 | Varma et al. ................... 381/92 |
| 2005/0047611 A1 | 3/2005 | Mao ........................... 381/94.7 |
| 2005/0226431 A1 | 10/2005 | Mao ............................ 381/61 |

FOREIGN PATENT DOCUMENTS

| | | |
|---|---|---|
| EP | 0 652 686 | 5/1995 |
| EP | 1 489 596 | 12/2004 |
| WO | WO 2004/073814 | 9/2004 |
| WO | WO 2004/073815 | 9/2004 |

OTHER PUBLICATIONS

U.S. Appl. No. 10/759,782, entitled "Method and Apparatus for Light Input Device", to Richard L. Mark, filed Jan. 16, 2004.
U.S. Appl. No. 11/429,414, entitled "Computer Image and Audio Processing of Intensity and Input Device When Interfacing With a Computer Program", to Richard L. Marks et al, filed May 4, 2006.

(Continued)

*Primary Examiner*—Alexander Jamal
(74) *Attorney, Agent, or Firm*—Joshua D. Isenberg; JDI Patent

(57) ABSTRACT

Methods and apparatus for echo cancellation in a system having a speaker and a microphone are disclosed. The speaker receives a speaker signal x(t). The microphone receives a microphone signal d(t) containing a local signal s(t) and an echo signal $x_1(t)$ that is dependent on the speaker signal x(t). The microphone signal d(t) is filtered in parallel with first and second adaptive filters having complementary echo cancellation properties relative to each other. A minimum echo output $e_3(t)$ is determined from an output $e_1(t)$ of the first adaptive filter and an output $e_2(t)$ of the second adaptive filter. The minimum echo output has a smaller energy and less correlation to the speaker signal x(t). A microphone output is then generated using the minimum echo output $e_3(t)$.

32 Claims, 4 Drawing Sheets

OTHER PUBLICATIONS

U.S. Appl. No. 11/381,725, entitled "Methods and Apparatus for Targeted Sound Detection", to Xiadong Mao, filed May 4, 2006.

U.S. Appl. No. 11/381,729, entitled "Ultra Small Microphone Array", to Xiadong Mao, filed May 4, 2006.

U.S. Appl. No. 11/381,727, entitled "Noise Removal for Electronic Device With Far Field Microphone on Console", to Xiadong Mao, filed May 4, 2006.

U.S. Appl. No. 11/381,724, entitled "Methods and Apparatus for Targeted Sound Detection and Characterization", to Xiadong Mao, filed May 4, 2006.

U.S. Appl. No. 11/418,988, entitled "Methods and Apparatuses for Adjusting a Listening Area for Capturing Sounds", to Xiadong Mao, filed May 4, 2006.

U.S. Appl. No. 11/418,989, entitled "Methods and Apparatuses for Capturing an Audio Signal Based on Visua Image", to Xiadong Mao, filed May 4, 2006.

U.S. Appl. No. 11/429,047, entitled "Methods and Apparatuses for Capturing an Audio Signal Based on a Location of the Signal", to Xiadong Mao, filed May 4, 2006.

U.S. Appl. No. 11/418,993, entitled "System and Method for Control by Audible Device", to Steven Osman, filed May 4, 2006.

U.S. Appl. No. 11/381,721, entitled "Selective Sound Source Listening in Conjunction With Computer Interactive Processing", to Xiadong Mao, filed May 4, 2006.

Mark Fiala et al., "A Panoramic Video and Acoustic Beamforming Sensor for Videoconferencing", IEEE, Oct. 2-3, 2004, pp. 47-52.

Kevin W. Wilson et al., "Audio-Video Array Source Localization for Intelligent Environments", IEEE 2002, vol. 2, pp. 2109-2112.

Y. Ephraim and D. Malah, "Speech enhancement using a minimum mean-square error short-time spectral amplitude estimator," *IEEE Trans. Acoust., Speech, Signal Processing*, vol. ASSP-32, pp. 1109-1121, Dec. 1984.

Y. Ephraim and D. Malah, "Speech enhancement using a minimum mean-square error log-spectral amplitude estimator," *IEEE Trans. Acoust., Speech, Signal Processing*, vol. ASSP-33, pp. 443-445, Apr. 1985.

International Search Report and Written Opinion of the International Searching Authority dated Oct. 17, 2008—International Patent Application No. PCT/ US07/65686.

* cited by examiner

ECHO AND NOISE CANCELLATION

CROSS-REFERENCE TO RELATED APPLICATIONS

This application is related to commonly-assigned, co-pending application Ser. No. 11/381,729, to Xiao Dong Mao, entitled ULTRA SMALL MICROPHONE ARRAY, filed the same day as the present application, the entire disclosures of which are incorporated herein by reference. This application is also related to commonly-assigned, co-pending application Ser. No. 11/381,725, to Xiao Dong Mao, entitled "METHODS AND APPARATUS FOR TARGETED SOUND DETECTION", filed the same day as the present application, the entire disclosures of which are incorporated herein by reference. This application is also related to commonly-assigned, co-pending application Ser. No. 11/381,727, to Xiao Dong Mao, entitled "NOISE REMOVAL FOR ELECTRONIC DEVICE WITH FAR FIELD MICROPHONE ON CONSOLE", filed the same day as the present application, the entire disclosures of which are incorporated herein by reference. This application is also related to commonly-assigned, co-pending application Ser. No. 11/381,724, to Xiao Dong Mao, entitled "METHODS AND APPARATUS FOR TARGETED SOUND DETECTION AND CHARACTERIZATION", filed the same day as the present application, the entire disclosures of which are incorporated herein by reference. This application is also related to commonly-assigned, co-pending application Ser. No. 11/371,721, to Xiao Dong Mao, entitled "SELECTIVE SOUND SOURCE LISTENING IN CONJUNCTION WITH COMPUTER INTERACTIVE PROCESSING", filed the same day as the present application, the entire disclosures of which are incorporated herein by reference. This application is also related to commonly-assigned, co-pending International Patent Application number PCT/US06/17483, to Xiao Dong Mao, entitled "SELECTIVE SOUND SOURCE LISTENING IN CONJUNCTION WITH COMPUTER INTERACTIVE PROCESSING", filed the same day as the present application, the entire disclosures of which are incorporated herein by reference. This application is also related to commonly-assigned, co-pending application Ser. No. 11/418,988, to Xiao Dong Mao, entitled "METHODS AND APPARATUSES FOR ADJUSTING A LISTENING AREA FOR CAPTURING SOUNDS", filed the same day as the present application, the entire disclosures of which are incorporated herein by reference. This application is also related to commonly-assigned, co-pending application Ser. No. 11/481,989, to Xiao Dong Mao, entitled "METHODS AND APPARATUSES FOR CAPTURING AN AUDIO SIGNAL BASED ON VISUAL IMAGE", filed the same day as the present application, the entire disclosures of which are incorporated herein by reference. This application is also related to commonly-assigned, co-pending application Ser. No. 11/429,047, to Xiao Dong Mao, entitled "METHODS AND APPARATUSES FOR CAPTURING AN AUDIO SIGNAL BASED ON A LOCATION OF THE SIGNAL", filed the same day as the present application, the entire disclosures of which are incorporated herein by reference.

FIELD OF THE INVENTION

Embodiments of the invention are related to audio signal processing and more particularly to echo and noise cancellation in audio signal processing.

BACKGROUND OF THE INVENTION

Many portable electronics devices, such as interactive video game controllers are capable of handling two-way audio signals. Such a device typically includes a microphone that receives a local speech signal s(t) from a user of the device and a speaker that emits a speaker signal x(t) that is audible to the user. To make the video game controller more compact it is often desirable to place the microphone and speaker relatively close to each other, e.g., within about 10 centimeters of each other. The user, by contrast may be much further from the microphone, e.g., about 3 to 5 meters away. The microphone produces a signal d(t) that includes both the local speech signal s(t) and a speaker echo signal $x_1(t)$. In addition, the microphone may pick up background noise n(t) so that the overall microphone signal $d(t)=s(t)+x_1(t)+n(t)$. Due to the relative proximity of the speaker, the microphone signal d(t) may be dominated by the speaker echo signal $x_1(t)$.

Speaker echo is a commonly observed phenomenon in telecommunications applications and echo suppression and echo cancellation are relatively mature technologies. Echo suppressors work by detecting if there is a voice signal going in one direction on a circuit, and then inserting a great deal of loss in the other direction. Usually the echo suppressor at the far-end of the circuit adds this loss when it detects voice coming from the near-end of the circuit. This added loss prevents the speaker signal x(t) from being retransmitted in the local speech signal d(t).

While effective, echo suppression often leads to several problems. For example it is common for the local speech signal s(t) and the remote speaker signal x(t) to occur at the same time, at least briefly. This situation is sometimes referred to as double-talk. The situation where only the remote speaker signal is present is sometimes referred to as remote single talk. Because each echo suppressor will then detect voice energy coming from the far-end of the circuit, the effect would ordinarily be for loss to be inserted in both directions at once, effectively blocking both parties. To prevent this, echo suppressors can be set to detect voice activity from the near-end speaker and to fail to insert loss (or insert a smaller loss) when both the near-end speaker and far-end speaker are talking. Unfortunately, this temporarily defeats the primary effect of having an echo suppressor at all.

In addition, since the echo suppressor is alternately inserting and removing loss, there is frequently a small delay when a new speaker begins talking that causes clipping of the first syllable from that speaker's speech. Furthermore, if the far-end party on a call is in a noisy environment, the near-end speaker will hear that background noise while the far-end speaker is talking, but the echo suppressor will suppress this background noise when the near-end speaker starts talking. The sudden absence of the background noise gives the near-end user the impression that the line has gone dead.

To address the above problems echo cancellation techniques were developed. Echo cancellation may use some form of analog or digital filter to remove unwanted noise or echoes from an input signal and produce a filtered signal e(t). In echo cancellation, complex algorithmic procedures are used to compute speech models. This involves feeding the microphone signal d(t) and some of the remote signal x(t) to an echo cancellation processor, predicting the speaker echo signal $x_1(t)$ then subtracting this from microphone signal d(t). The format of the echo prediction must be learned by the echo cancellation processor in a process known as adaptation.

The effectiveness of such techniques is measured by an echo suppression ratio (ESR), which is just the ratio (typically expressed in decibels) of the true echo energy received at the microphone to residual echo energy left in the filtered signal $x_1(t)$. According to standards defined by International Telecommunication Union (ITU), the level of the echo is require an attenuation (ESR) of at least 45 dB in case of remote single talk. During double talk (or during strong background noise) this attenuation can be lowered to 30 dB. However, these recommendations were developed for systems where the user generating the local speech signal is much closer to the microphone, so the recorded SNR (ratio of target voice energy to echo noise energy) is better than 5 dB mostly For applications such as video game controllers, where the user may be 3 to 5 meters away, and a loudspeaker plays loud echoes very close to an open microphone less than 0.5 meter away, the resulting SNR may be less than −15 dB to −30 dB an ESR greater than about 60 dB may be required for remote single talk, and 35 db for double-talk Existing echo cancellation techniques cannot achieve such a high level of ESR.

Thus, there is a need in the art, for an echo cancellation system and method that overcomes the above disadvantages.

SUMMARY OF THE INVENTION

To overcome the above disadvantages, embodiments of the invention are directed to methods and apparatus for echo cancellation in a system having a speaker and a microphone. The speaker receives a speaker signal $x(t)$. The microphone receives a microphone signal $d(t)$ containing a local signal $s(t)$ and an echo signal $x_1(t)$ that is dependent on the speaker signal $x(t)$. The microphone signal $d(t)$ is filtered in parallel with first and second adaptive filters having complementary echo cancellation properties relative to each other. A minimum echo output $e_3(t)$ is determined from an output $e_1(t)$ of the first adaptive filter and an output $e_2(t)$ of the second adaptive filter. The minimum echo output has a smaller energy and less correlation to the speaker signal $x(t)$. A microphone output is then generated using the minimum echo output $e_3(t)$. Residual echo cancellation and/or noise cancellation may optionally be applied to the minimum echo output.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the invention propose a novel structure of an integrated echo and noise-canceller that has two functionally identical filters with orthogonal controls and representations. In such a configuration the two orthogonal filters complement each other in a way that can boost the overall system robustness in a noisy hands free voice communication.

In particular, an integrated echo-noise-canceller uses two separately controlled sub-systems in parallel, each with orthogonal control mechanism. The echo-noise-canceller includes a front echo canceller and a backup echo canceller. The front echo-canceller uses double-talk detection and takes conservative adaptation approaches to ensure it is robust against local voice, yet provide less echo-suppression and slow adaptation speech to echo-change. The backup echo-canceller uses cross-correlation to measure the similarity between the error signal and echo signal, it takes an aggressive strategy to ensure the filter is quickly updated and provides large echo-suppression, yet it is unstable to local voice/noise, due to possible over adaptation. An integration of these two echo-canceller outputs is based on cross-correlation analysis that measures which echo canceller has a larger differentiation against the echo signal. The integration also checks the filter stability of both echo cancellers. If one filter is overestimated or underestimated it is then complemented by the other filter. Such a system is designed to ensure there is at one filter working correctly at any given time.

The system may optionally include an echo-residual-noise-estimator that takes a similar approach using two independent sub estimators in parallel, each with orthogonal controlling. A first estimator is based on echo-distance-mismatch that depends on a robust double-talk-detector. The first estimator is relatively accurate yet not stable due to double-talk-detection errors. A second estimator is based on cross-spectrum-analysis. Its estimation is biased but stable and consistent without depending on local voice detection. The integration of these two estimations of the residual echo takes a minimum/maximum approach for far-end-talk only and double-talk respectively.

Figure 1A:
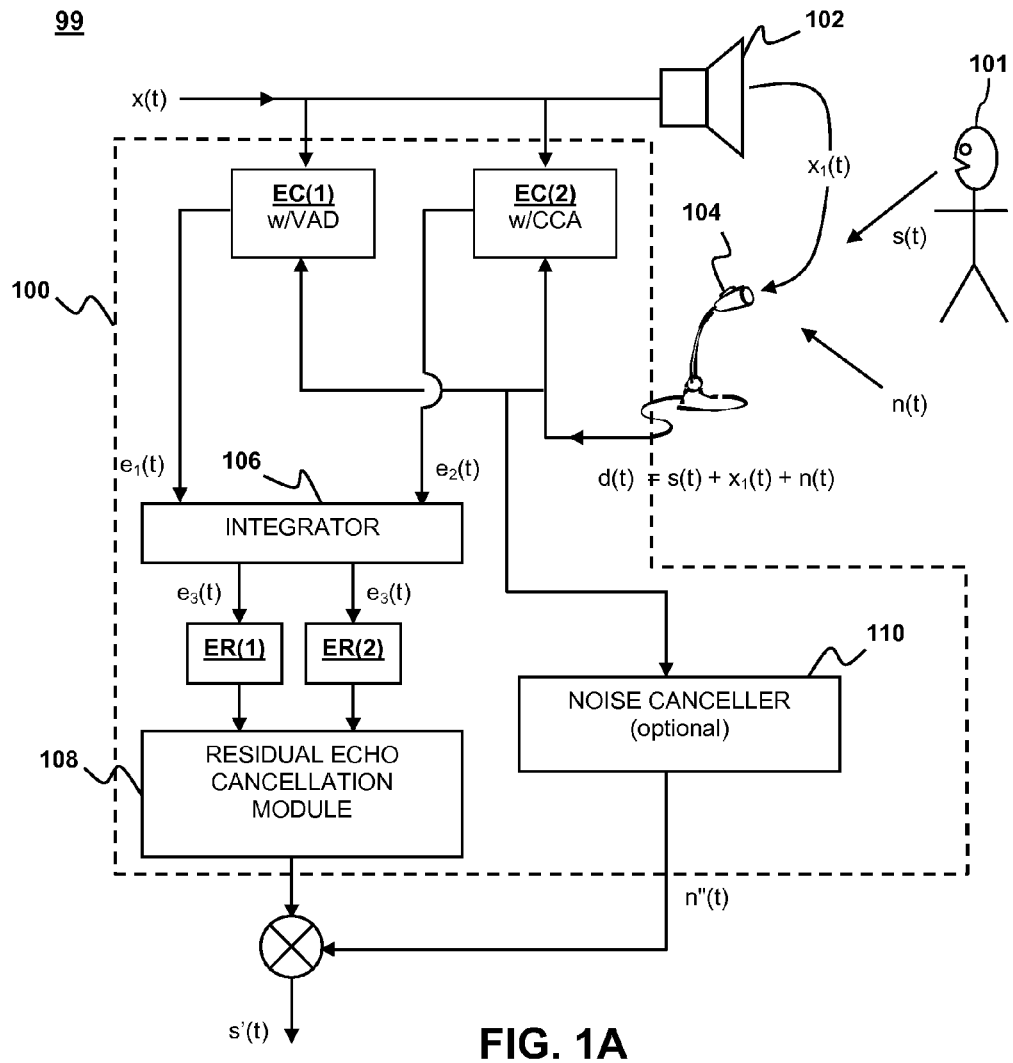
FIG. 1A is a schematic diagram of an echo cancellation apparatus according to an embodiment of the present invention.
Figure 2A:
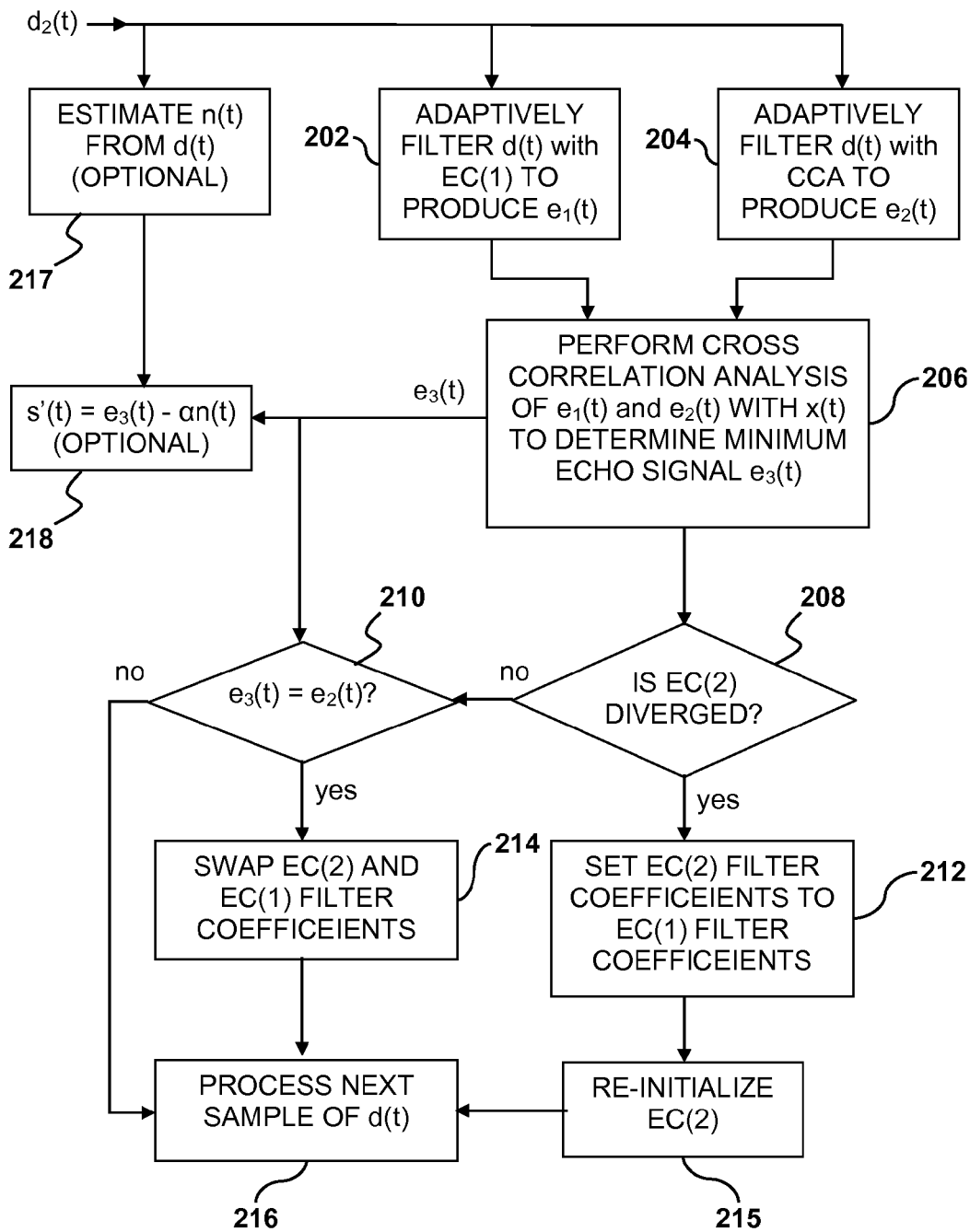
FIG. 2A is a flow diagram illustrating a method for echo cancellation according to an embodiment of the present invention.
Figure 2B:
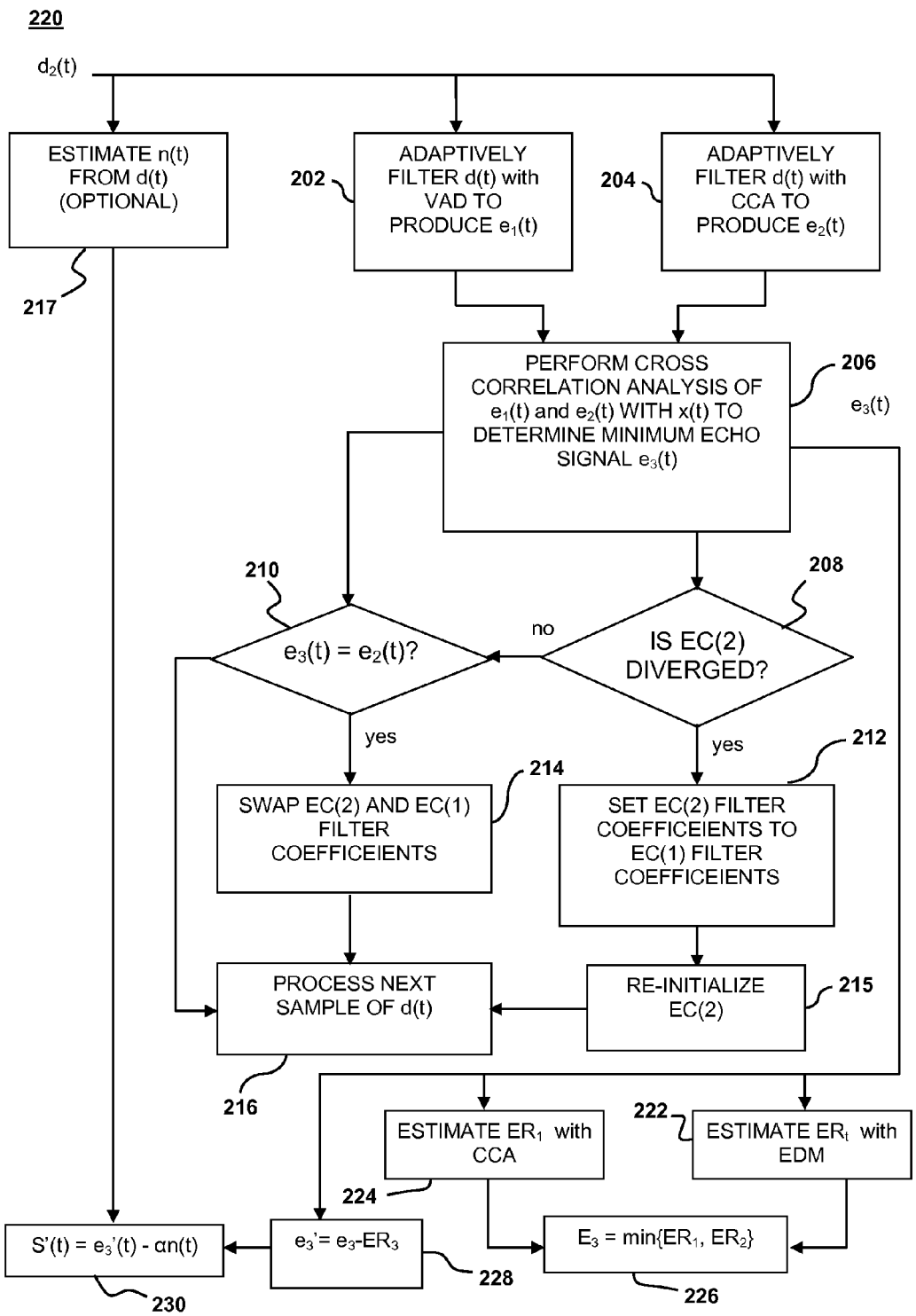
FIG. 2B is a flow diagram illustrating an alternative method for echo cancellation according to an embodiment of the present invention.

FIG. 1A shows an example of an audio system 99 utilizing an echo cancellation apparatus 100 according to an embodiment of the present invention. Operation of the apparatus 100 may be understood by referring to the flow diagrams of method 200 shown in FIG. 2A and method 220 shown in FIG. 2B. The audio system 99 generally includes a speaker 102 that receives a remote signal $x(t)$ and a microphone 104. A local source 101 produces local speech signal $s(t)$. The microphone 104 receives both the local speech signal $s(t)$ and an echo signal $x_1(t)$ that is related to the speaker signal $x(t)$. The microphone 104 may also receive noise $n(t)$ originating from the environment in which the microphone 104 is located. The microphone 104 thus generates a microphone signal $d(t)$, which may be given by $d(t)=s(t)+x_1(t)+n(t)$ The echo cancellation apparatus 100 generally includes a first adaptive echo cancellation filter EC(1) and a second adaptive echo cancellation filter EC(2). Each adaptive filter receives the microphone signal $d(t)$ and the speaker signal $x(t)$. As shown in FIGS. 2A-2B, filter EC(1) adaptively filters the microphone signal $d(t)$ as indicated at 202 while the second filter EC(2) adaptively filters the microphone signal $d(t)$ in parallel with the first filter EC(1) as indicated at 204. As used herein, the filters are said to operate in parallel if they receive the substantially the same input d(t). Parallel operation is distinguished from serial operation where an output of one filter serves as an input for the other. Depending on the status of the two filters EC(1), EC(2) one filter serves as a main or "front" filter and the other serves as a "backup" filter. One filter takes a conservative approach to echo cancellation while the other takes a more aggressive approach.

The status of the filters EC(1), EC(2) may be understood with respect to the following signal model:

$$y(t)=x(t)*h(n)$$

$$d(t)=y_0(t)+s(t)$$

$$e(t)=d(t)-y(t)$$

where:
y(t) is the echo synthesized by the echo-canceller filter.
x(t) is the echo that is playing in loudspeaker
h(n) is the adaptive filter function of echo-canceller filter
d(t) is the noisy signal received by microphone,
$y_0(t)$ is the true echo appeared in microphone,
s(t) is local voice, and
e(t) is echo-cancelled residual signal produced by the echo canceller filter.

The two filters EC(1), EC(2) have complementary echo cancellation properties. As used herein, two adaptive filters receiving the same inputs are said to have complementary echo cancellation if the filtering properties of the two filters are such that one filter is well adapted to its inputs when the other is not. In the context of the present application, a filter is said to be "well adapted" when its filter function h(n) is stable, converged to the true echo-path-filter and neither overestimated nor underestimated.

If h(n) is converged to the true echo-path-filter $y(t) \sim = y_0(t)$, i.e., the estimated echo is approximately equal to the true echo. The status of the echo canceller filters EC(1), EC(2) may be quantified in terms of a coherence function $\alpha$ involving the cross-correlation between y(t) and e(t), where:

$\alpha = E(e(t)*y(t))/E(y(t)*y(t))$, where "E" stands for the statistical expectation value and the operator "*" represents the cross-correlation operation. For discrete functions $f_i$ and $g_i$ the cross-correlation is defined as $$(f*g)_i = \sum_j f_j^* g_{i+j}$$

where the sum is over the appropriate values of the integer j and an asterisk indicates the complex conjugate. For continuous functions f(x) and g(x) the cross-correlation is defined as $$(f*g)(x) \equiv \int f^*(t)g(x+t)dt$$

where the integral is over the appropriate values of t.

In the coherence function $\alpha$, the numerator stands for cross-correlation of e(t) and y(t), the denominator stands for auto-correlation of y(t) which serves as a normalization term.

Ideally, if h(n) is converged, $\alpha$ should be close to "0" (since the residual signal e(t) does not include y(t)). If h(n) is not converged, $\alpha$ should be close to "1" (since e(t) contains strong echo of y(t). if h(n) is illness and diverged, $\alpha$ should be negative (since e(t) contains 180 phase shifted strong echo due to filter divergence).

Thus, by way of example and without limitation, the value of the coherence function $\alpha$ may be used to define four different possible states for the status of the filters EC(1), EC(2):

(1) If filter h(n) is stable, converged and neither overestimated nor underestimated:

$0<=\alpha<=0.1$ (2) If filter h(n) is stable but under-estimated (not converged yet): alpha >0.2
(3) If filter h(n) is over-estimated: alpha <-0.1
(4) If filter h(n) is diverged: alpha <-0.25

Those of skill in the art will recognize that different ranges of the values of $\alpha$ for these different states may be determined empirically.

If a filter is in good status (e.g., state (1)), its settings may be saved for later recovery if it should subsequently become diverged. If a filter is diverged, under-estimated or over-estimated, the front and backup echo-cancellers will exchange their roles. The front filter becomes the backup while the backup filter assumes the front filter role. Since one filter takes a conservative adaptation approach while the other takes an aggressive adaptation approach, this change should eventually make both filters converge faster and be more dynamically stable.

Also, if a filter is under-estimated or over-estimated, its adaptation step-size may be increased or decreased respectively by small delta amount to accelerate or decelerate the adaptation-speed for faster convergence or better tracking stability. Usually, faster convergence takes a larger step-size, which sacrifices good tracking to detail and lowers the echo-suppression-ratio ESR. Slower convergence by using a smaller step-size is more stable and has better capability to track subtle changes but is less suitable for fast tracking of echo dislocation.

By combining the dynamic step-size and front/backup filter exchange, the overall system is well balanced in terms of fast tracking vs. detail-tracking, stability vs. convergence. These two are really the fundamental twin challenges in adaptive system design.

If one of the filters is diverged, the other filter's settings may be copied to reinitiate the diverged filter if the other filter is in good status. Otherwise the diverged filter may be recovered using filter settings from a previously saved good status.

By way of example, and without limitation, echo canceling adaptive filters EC(1) and EC(2) may be based on frequency domain normalized least mean square adaptive filters. Each filter may be implemented in hardware or software or a combination of hardware and software.

Figure 1B:
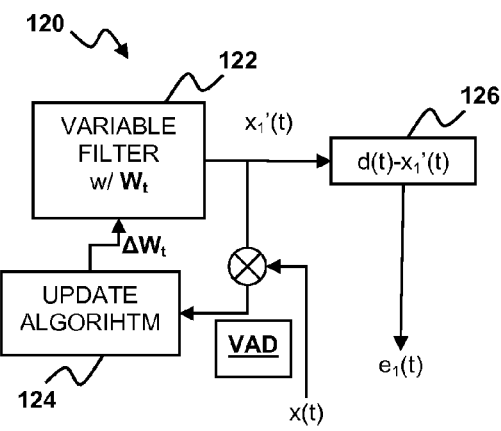
FIG. 1B is a schematic diagram of an adaptive filter with voice activity detection that may be used in the echo cancellation apparatus of FIG. 1A.
Figure 1C:
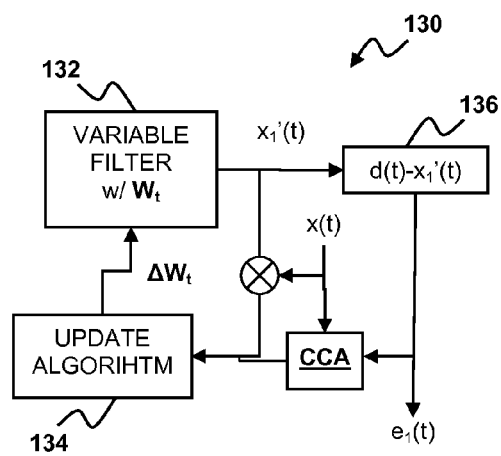
FIG. 1C is a schematic diagram of an adaptive filter with cross-correlation analysis that may be used in the echo cancellation apparatus of FIG. 1A.

FIGS. 1B and 1C depict examples of suitable complementary adaptive filters. Specifically, FIG. 1B depicts an adaptive echo cancellation filter 120 with voice activity detection that may be used as the first adaptive filter EC(1). The filter 120 includes a variable filter 122 having finite impulse response (FIR) filters characterized by filter coefficients $w_t$. The variable filter 122 receives the microphone signal d(t) and filters it according to the values of the filter coefficients wt to produce a filtered signal d'(t). The variable filter 124 estimates a desired signal by convoluting the input signal with the impulse response determined by the coefficients $w_{t1}$. Each filter coefficient $w_{t1}$ is updated at regular intervals by an amount $\Delta w_t$ according to an update algorithm 124. By way of example, the filter coefficients $w_t$ may be chosen such that the filtered signal d'(t) attempts to estimate the speaker echo signal $x_1(t)$ as the desired signal. A difference unit 126 subtracts the filtered signal d'(t) from the microphone signal d(t) to provide an estimated signal $e_1(t)$, which estimates the local speech signal s(t). The filtered signal d'(t) can be subtracted from the remote signal x(t) to produce an error signal e(t) that is used by the update algorithm 124 to adjust the filter coefficients $w_t$. The adaptive algorithm 124 generates a correction factor based on the remote signal x(t) and the error signal. Examples of coefficient update algorithms include least mean squares (LMS) and recursive least squares (RLS). In an LMS update algorithm, e.g., the filter coefficients are updated according to $w_{t1+1}=w_{t1}+\mu e(t)x(t)$, where $\mu$ refers to a step size. Initially, all $w_{t1}=0$. Note that in this example the quantity $\mu e(t)x(t)$ is the amount $\Delta w_t$. As described above, the step size $\mu$ may be dynamically adjusted depending on the state of the adaptive filter. Specifically, if the filter is under-estimated the step size $\mu$ may be increased by small delta amount to accelerate the adaptation-speed for faster convergence. Alternatively, if the filter is overestimated, its adaptation step-size $\mu$ may be decreased respectively by small delta amount to decelerate the adaptation-speed for better tracking stability.

This is time-domain expression e(t)x(t) is a multiplication. This computation may be implemented in the frequency domain as follows. First e(t), x(t) and h(n) may be converted from the time domain to the frequency domain, e.g., by fast Fourier transform (fft).

E(k)=fft(e(t));
X(k)=fft(x(t));
H(K)=fft(h(n))

the actual LMS update algorithm in the frequency domain becomes:

$$H(k)=H(k)+(\mu * conj(X(k)) \cdot * E(k))/(\Delta + X(k) * conj(X(k)))$$

where:
  $\mu$ is the filter adaptation stepsize, it is dynamic;
  conj (a) refers the complex conjugate of a complex number a;
  * refers to complex multiplication; and
  $\Delta$ is a regulator that prevents the denominator from becoming numerically unstable.

In the above equation, "conj(X(k)).*E(k)" performs the "e(t)x(t)" task. In the denominator, "X(k)*conj(X(k))" serves a normalization purpose for better stability.

Voice activated detection VAD adjusts the update algorithm 124 such that variable filter 122 only adaptively filters the microphone signal d(t) when the remote signal x(t) is present, i.e., above a predetermined threshold. An adaptive filter of the type shown in FIG. 1B that uses voice activated detection (sometimes also referred to as double talk detection), is a relatively slowly adapting filter but it is also very accurate in that it generates very few false positives. A complementary adaptive filter to the filter 120 would be one that, e.g., adapts relatively quickly, but tends to generate frequent false positives.

By way of example, FIG. 1C depicts an adaptive filter 130 that is complementary to the filter 120 of FIG. 1B. The adaptive filter 130 includes a variable filter 132 characterized by filter coefficients $w_{t2}$ and an update algorithm 134 (e.g., a LMS update algorithm as described above). The filter 132 attempts to estimate the speaker echo signal $x_1(t)$ as the desired signal. A difference unit 136 subtracts the filtered signal d'(t) from the microphone signal d(t) to provide an estimated signal $e_2(t)$, which estimates the local speech signal s(t). The filtered signal d'(t) can be subtracted from the remote signal x(t) to produce an error signal e(t) that is used by the update algorithm 134 to adjust the filter coefficients $w_{t2}$. In the filter 130 a cross-correlation analysis CCA adjusts the update algorithm 134 such that variable filter 132 attempts to reduce cross-correlation between the estimated signal $e_2(t)$ and the speaker echo signal x(t).

If $e_2(t)$ and x(t) are very strongly correlated, the filtering is said to be underestimated and the update algorithm 134 may be adjusted to increase $\Delta w_{t2}$. If the cross-correlation between $e_2(t)$ and x(t) is below a threshold the filtering is said to be overestimated and the update algorithm 134 may be adjusted to reduce $\Delta w_{t2}$.

An adaptive filter of the type shown in FIG. 1C that uses cross-correlation analysis (sometimes also referred to as cross-spectrum analysis), is a relatively rapidly adapting filter but it is also unstable in that generates frequent false positives. Thus, filters 120 and 130 are examples of complementary filters.

Referring again to FIG. 1A, an integrator 106 is coupled to the first adaptive filter EC(1) and the second adaptive filter EC(2). The integrator 106 is configured to determine a minimum echo output $e_3(t)$ from the outputs $e_1(t)$, $e_2(t)$ of the first and second adaptive filters respectively. The minimum echo output $e_3(t)$ is the one of $e_1(t)$ and $e_2(t)$ having the smaller energy and less correlation to the speaker signal x(t). If one of $e_1(t)$ and $e_2(t)$ has the smaller energy but the other has less correlation to x(t) the one with the smaller correlation is used as the minimum echo output $e_3(t)$. For example, if one of the filters is overestimated (i.e., it tends to cancel out target voice thus have smaller energy output), the smaller correlation is better regardless the energy. The minimum energy may be determined by determining a minimum of $E\{e_1(t)\}$ and $E\{e_2(t)\}$, where $E\{\}$ refers to the operation of determining the expectation value of the quantity in braces. Referring again to FIGS. 2A-2B, at 206 a cross correlation analysis may be performed on $e_1(t)$ and $e_2(t)$ to determine which of $e_1(t)$ and $e_2(t)$ has the smaller cross-correlation with the speaker signal x(t). The cross-correlation analysis may include determining a minimum of $E\{e_1(t)*x(t)\}$ and $E\{e_2(t)*x(t)\}$, where the "*" operator refers to the operation of taking the cross-correlation between the quantities on either side of the operator, e.g. as defined above. The minimum echo output $e_3(t)$ may be used as a filtered output of the microphone 104.

In some situations, one of the filters EC(1), EC(2) may excessively filter out the local signal s(t). In such a situation, the filter is said to be "diverged". This is a very real possibility particularly where EC(2) is cross-correlation filter, e.g., of the type shown in FIG. 1C. To address this possibility, at 208 it is determined whether EC(2) is diverged. By way of example, the integrator 106 may be configured to determine whether the second adaptive echo cancellation filter EC(2) is excessively filtering out the local signal s(t). This can be done by examining the expectation value of the cross-correlation between $e_2(t)$ with the speaker echo signal x(t), i.e., $E\{e_2(t)*x(t)\}$. Typically, $E\{e_2(t)*x(t)\}>0$. However, if $E\{e_2(t)*x(t)\}$ is less than some threshold, e.g., about 0.2, EC(2) is excessively filtering out the local signal s(t). In such a situation, the integrator 106 may select $e_1(t)$ as the minimum echo output $e_3(t)$. To stabilize the adaptive filtering the EC(2) filter coefficients $w_{t2}$ may be set to the values of the EC(1) filter coefficients $w_{t1}$ at 212. EC(2) may then be re-initialized at 215 to zero or to a previous known, well-adapted state. For example, the filter coefficients may be saved at regular intervals, e.g., about every 10 to 20 seconds so that they may be used to re-initialize EC(2) if it diverges.

Normally, a cross-correlation filter is well-adapted if it is not diverged. Since EC(2) and EC(1) have complementary filtering properties, when EC(2) is well-adapted EC(1) is underestimated. To stabilize the adaptive filtering the filter coefficients $w_{t1}$ for the first adaptive filter EC(1) may be swapped with the filter coefficients $w_{t2}$ for the second adaptive filter EC(2) as indicated at 214 if EC(2) is not diverged and e(2)=e(3) as indicated at 210. The next sample of d(t) may then be processed, as indicated at 216. For software implementations of the filters, the coefficients $w_{t1}$, $w_{t2}$ may be stored at locations in a memory that are identified by pointers. The coefficients $w_{t1}$, $w_{t2}$ may be swapped, e.g., by switching the pointers to $w_{t1}$ and $w_{t2}$.

The minimum echo output $e_3(t)$ may include some residual echo xe(t) from the speaker signal x(t). The apparatus 100 may optionally include echo first and second residual estimators ER(1) and ER(2) coupled to the integrator 106 and a residual echo cancellation module 108 coupled to the echo residual estimators ER(1) and ER(2).

The first echo residual estimator ER(1) may be configured to generate a first residual echo estimation $ER_1(t)$ that includes a cross-correlation analysis between the minimum echo output $e_3(t)$ and the speaker signal x(t). As indicated at 222 of FIG. 2B, the first residual echo estimation $ER_1(t)$ may be determined from a cross-correlation analysis between the minimum echo output $e_3(t)$ and the speaker signal x(t), e.g., by determining argmin(E{$e_3(t)$*x(t)}), where argmin(E{$e_3(t)$*x(t)}) is true if $e_3(t)$ minimizes the expectation value of the cross-correlation $e_3(t)$*x(t). This minimization problem may essentially be realized adaptively. For example, assume first echo residual estimator ER(1) is initially a unit filter (all "1" values). At every frame, the first residual echo estimation $ER_1(t)$ may be increased toward a tangent direction on search surface. This may be implemented using a Newton solver algorithm. The second echo residual estimator ER(2) may be configured to determine a second residual echo estimation $ER_2(t)$ that includes an echo-distance mismatch between the minimum echo output $e_3(t)$ and the speaker signal x(t). As indicated at 224 of FIG. 2B, the second residual echo estimation $ER_2(t)$ may be determined from an echo-distance mismatch between the minimum echo output $e_3(t)$ and the speaker signal x(t), e.g., by determining argmin(E{$(e_3(t))^2/(x(t))^2$}), where argmin(E{$(e_3(t))^2/(x(t))^2$}) is true if $e_3(t)$ minimizes the expectation value of the quotient $(e_3(t))^2/(x(t))^2$. Again, the minimization may be implemented using a Newton solver algorithm.

The residual echo cancellation module 108 determines a minimum residual echo estimation $ER_3(t)$ of the two residual echo estimations $ER_1(t)$ and $ER_2(t)$ and adjusts the filtered signal $e_3(t)$ according to the minimum value $ER_3(t)$. By way of example, the minimum residual echo estimation $ER_3(t)$ may be the one of $ER_1(t)$ and $ER_2(t)$ having a minimum energy and minimum correlation to x(t). For example, as indicated at 226 in FIG. 2B, is set equal to the minimum of $ER_1(t)$ and $ER_2(t)$ and the resulting value of $ER_3$ is subtracted from $e_3(t)$ to produce a residual echo cancelled filtered signal $e_3'(t)$, as indicated at 228. If $ER_3$ is equal to $ER_1(t)$ then the residual echo xe(t) is minimally removed when the local speech signal s(t) has a non-zero magnitude. If $ER_3(t)$ is equal to $ER_2(t)$ then the residual echo xe(t) is maximally removed when far end echo x(t) only is present (far-end-talk only period).

By way of example second order norms N(1), N(2) may be computed for the two echo residual estimators ER(1) and ER(2) respectively.

$$N(1)=\|ER(1)\|$$

$$N(2)=\|ER(2)\|$$

Under double-talk, the echo residual estimator having smaller norm is applied to $e_3(t)$ to remove the echo residual noise. Under single-talk, the echo residual estimator having the larger norm is applied to $e_3(t)$ to remove the echo residual noise.

The echo cancellation may remove the noise n(t) from the filtered signal $e_3(t)$ or the residual echo cancelled filtered signal $e_3'(t)$. Such noise cancellation may be undesirable since a remote recipient of the signal $e_3(t)$ or $e_3'(t)$ may interpret the absence of noise an indication that all communication from the microphone 104 has been lost. To overcome this, the apparatus 100 may optionally include a noise canceller unit 110. The noise cancellation module 110 may be configured to compute an estimated noise signal n'(t) from the microphone signal d(t), e.g., as indicated at 217 of FIGS. 2A-2B. The estimated noise signal n'(t) may be attenuated by an attenuation factor $\alpha$ to form a reduced noise signal n"(t)=$\alpha$n'(t). The reduced noise signal n"(t) may be incorporated into a microphone output signal s'(t) by adding to $e_3(t)$ as indicated at 218 of FIG. 2A or by adding it to $e_3'(t)$ as indicated at 230 of FIG. 2B.

Figure 3:
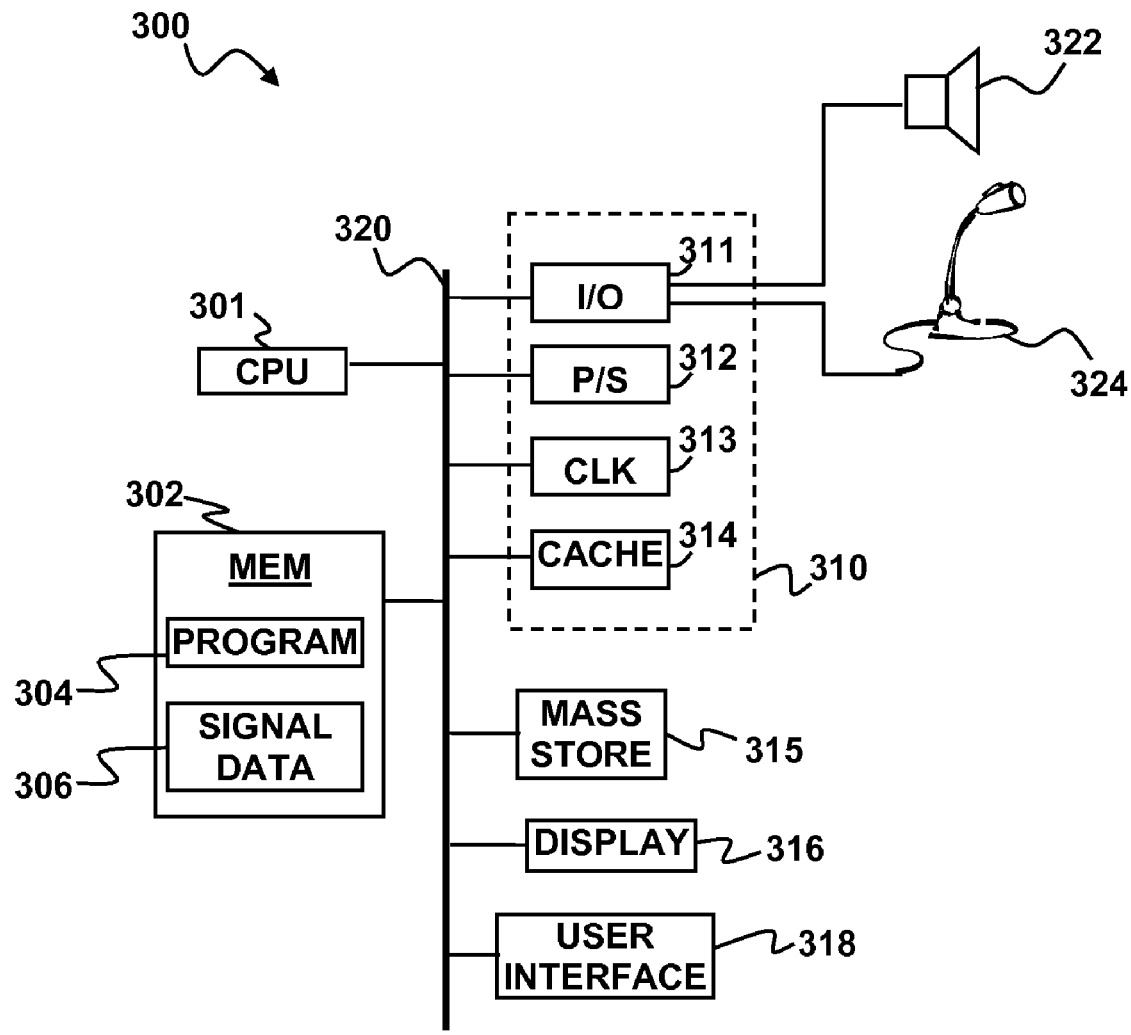
FIG. 3 is a schematic diagram of an echo cancellation apparatus according to an alternative embodiment of the present invention.

In embodiments of the present invention, the apparatus described above with respect to FIGS. 1A-1C and the methods described above with respect to FIG. 2A-2B may be implemented in software on a system having a programmable processor and a memory According to embodiments of the present invention, a signal processing method of the type described above with respect to FIG. 1, and FIGS. 2A-2B operating as described above may be implemented as part of a signal processing apparatus 300, as depicted in FIG. 3. The system 300 may include a processor 301 and a memory 302 (e.g., RAM, DRAM, ROM, and the like). In addition, the signal processing apparatus 300 may have multiple processors 301 if parallel processing is to be implemented. The memory 302 includes data and code configured as described above. Specifically, the memory 302 may program code 304 and signal data 306. The code 304 may implement the echo canceling adaptive filters EC(1), EC(2), integrator 106, echo residual filters ER(1), ER(2) residual echo cancellation module 108 and noise canceller 110 described above. The signal data 306 may include digital representations of the microphone signal d(t) and/or the speaker signal x(t).

The apparatus 300 may also include well-known support functions 310, such as input/output (I/O) elements 311, power supplies (P/S) 312, a clock (CLK) 313 and cache 314. The apparatus 300 may optionally include a mass storage device 315 such as a disk drive, CD-ROM drive, tape drive, or the like to store programs and/or data. The controller may also optionally include a display unit 316 and user interface unit 318 to facilitate interaction between the controller 300 and a user. The display unit 316 may be in the form of a cathode ray tube (CRT) or flat panel screen that displays text, numerals, graphical symbols or images. The user interface 318 may include a keyboard, mouse, joystick, light pen or other device. In addition, a speaker 322 and a microphone 324 may be coupled to the processor 301 via the I/O elements 311. The processor 301, memory 302 and other components of the system 300 may exchange signals (e.g., code instructions and data) with each other via a system bus 320 as shown in FIG. 3.

As used herein, the term I/O generally refers to any program, operation or device that transfers data to or from the system 300 and to or from a peripheral device. Every data transfer may be regarded as an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, such as a CD-ROM drive, CD-R drive or internal modem or other peripheral such as a flash memory reader/writer, hard drive.

The processor 301 may perform digital signal processing on signal data 306 as described above in response to the data 306 and program code instructions of a program 304 stored and retrieved by the memory 302 and executed by the processor module 301. Code portions of the program 304 may conform to any one of a number of different programming languages such as Assembly, C++, JAVA or a number of other languages. The processor module 301 forms a general-purpose computer that becomes a specific purpose computer when executing programs such as the program code 304. Although the program code 304 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

In one embodiment, among others, the program code 304 may include a set of processor readable instructions that implement a method having features in common with the method 200 of FIG. 2A or the method 220 of FIG. 2B. The program code 304 may generally include instructions that direct the processor 301 to filter a microphone signal d(t) in parallel with first and second adaptive filters having complementary echo cancellation properties to produce echo cancelled outputs $e_1(t)$ and $e_2(t)$; instructions for determining a minimum echo output $e_3(t)$ from $e_1(t)$ and $e_2(t)$; and instructions for generating a microphone output using the minimum echo output $e_3(t)$.

Embodiments of the present invention allow for more robust yet accurate echo cancellation that would be possible with cross-correlation analysis alone or with voice activity detection (double talk detection) alone. Such improved echo cancellation can extract the local speech signal s(t) from a microphone signal d(t) that is dominated by speaker echo x(t).

Embodiments of the present invention may be used as presented herein or in combination with other user input mechanisms and notwithstanding mechanisms that track or profile the angular direction or volume of sound and/or mechanisms that track the position of the object actively or passively, mechanisms using machine vision, combinations thereof and where the object tracked may include ancillary controls or buttons that manipulate feedback to the system and where such feedback may include but is not limited light emission from light sources, sound distortion means, or other suitable transmitters and modulators as well as controls, buttons, pressure pad, etc. that may influence the transmission or modulation of the same, encode state, and/or transmit commands from or to a device, including devices that are tracked by the system and whether such devices are part of, interacting with or influencing a system used in connection with embodiments of the present invention.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for echo cancellation in a system having a speaker and a microphone, the speaker receiving a speaker signal x(t), the microphone receiving a microphone signal d(t) containing a local signal s(t) and an echo signal $x_1(t)$, wherein the echo signal $x_1(t)$ is dependent on the speaker signal x(t), the method comprising:
   filtering the microphone signal d(t) in parallel with a first adaptive filter and a second adaptive filter, wherein the first adaptive filter has complementary echo cancellation properties relative to the second adaptive filter;
   determining a minimum echo output $e_3(t)$ from an output $e_1(t)$ of the first adaptive filter and an output $e_2(t)$ of the second adaptive filter, wherein the minimum echo output has less correlation to the speaker signal x(t); and
   generating a microphone output using the minimum echo output $e_3(t)$.

2. The method of claim 1 wherein filtering the microphone signal d(t) in parallel with the first adaptive filter and the second adaptive filter includes adapting a set of filter coefficients of the first adaptive filter when a magnitude of x(t) is above a threshold and performing cross-correlation analysis between d(t) and x(t) with the second adaptive filter.

3. The method of claim 2 wherein determining a minimum echo output $e_3(t)$ includes determining whether a cross-correlation between d(t) and x(t) is above a threshold for excessively filtering out the local signal s(t); and if the cross-correlation is above the threshold for excessively filtering out the local signal s(t) using the output of the first adaptive filter as the minimum echo output.

4. The method of claim 3 wherein determining whether the second adaptive filter is excessively filtering out the local signal s(t) includes performing a cross-correlation between the output of the second adaptive filter and the speaker signal x(t).

5. The method of claim 3 further comprising, if the second adaptive filter is excessively filtering out the local signal s(t), replacing a set of filter coefficients for the second adaptive filter with a set of filter coefficients for the first echo cancellation filter.

6. The method of claim 1 wherein generating a microphone output using the minimum echo output $e_3(t)$ includes determining in parallel a first residual echo estimation $ER_1(t)$ that includes a cross-correlation analysis between the minimum echo output $e_3(t)$ and the speaker signal x(t) and determining a second residual echo estimation $ER_2(t)$ that includes an echo-distance mismatch between the minimum echo output $e_3(t)$ and the speaker signal x(t).

7. The method of claim 6 wherein the cross-correlation analysis includes a computation of an expectation value of a cross-correlation between $e_3(t)$ and x(t).

8. The method of claim 6 wherein the echo distance mismatch includes a computation of an expectation value of $\{e_3^2(t)/x^2(t)\}$.

9. The method of claim 6 wherein determining a first residual echo estimation $ER_1(t)$ includes computing a second order norm N(1) of a first residual echo estimator ER(1) and wherein determining a second residual echo estimation $ER_2(t)$ includes computing a second order norm N(2) of a second residual echo estimator ER(2), the method further comprising, during a period of double-talk, applying to $e_3(t)$ the echo residual estimator ER(1) or ER(2) for which the corresponding norm N(1) or N(2) is smaller.

10. The method of claim 6 wherein determining a first residual echo estimation $ER_1(t)$ includes computing a second order norm N(1) of a first residual echo estimator ER(1) and wherein determining a second residual echo estimation $ER_2(t)$ includes computing a second order norm N(2) of a second residual echo estimator ER(2), the method further comprising, during a period of single-talk, applying to $e_3(t)$ the echo residual estimator ER(1) or ER(2) for which the corresponding norm N(1) or N(2) is larger.

11. The method of claim 6 wherein generating a microphone output using the minimum echo output $e_3(t)$ further includes determining a minimum residual echo estimation $ER_3(t)$, wherein the minimum residual echo estimation $ER_3(t)$ is the one of $ER_1(t)$ and $ER_2(t)$ having a minimum energy and minimum correlation to x(t).

12. The method of claim 11 further comprising and selectively removing $ER_3(t)$ from the minimum echo output $e_3(t)$.

13. The method of claim 12 wherein selectively removing $ER_3(t)$ from the microphone output includes maximally removing $ER_3(t)$ from the microphone output during a far-end-talk only period.

14. The method of claim 12 wherein selectively removing $ER_3(t)$ from the microphone output includes minimally removing $ER_3(t)$ from the microphone output if the local signal s(t) has a non-zero magnitude.

15. The method of claim 1 further comprising computing an estimated noise signal n'(t) from the microphone signal d(t); and reducing a level of the estimated noise signal n'(t) to form a reduced noise signal n"(t); and incorporating the reduced noise signal n"(t) into the microphone output signal.

16. An echo cancellation apparatus for use in a system having a speaker and a microphone, the speaker being adapted to receive a speaker signal x(t), the microphone being adapted to generate a microphone signal d(t) containing a local signal s(t) and an echo signal $x_1(t)$, wherein the echo signal $x_1(t)$ is dependent on the speaker signal x(t), the apparatus comprising:
   a first adaptive filter coupled to the speaker and the microphone; and
   a second adaptive filter coupled to the speaker and the microphone in parallel with the first adaptive filter, wherein the second adaptive filter has complementary echo cancellation properties relative to the first adaptive filter;
   an integrator coupled to the first adaptive filter and the second adaptive filter, wherein the integrator is configured to determine a minimum echo output $e_3(t)$ from an output $e_1(t)$ of the first adaptive filter and an output $e_2(t)$ of the second adaptive filter, wherein the minimum echo output has less correlation to the speaker signal x(t).

17. The apparatus of claim 16 wherein the integrator is configured to determine whether the second echo cancellation filter is excessively filtering out the local signal s(t); wherein if the second adaptive filter is excessively filtering out the local signal s(t) integrator selects the $e_1(t)$ as the minimum echo output $e_3(t)$.

18. The apparatus of claim 16 wherein the first adaptive filter is a voice activity detector filter.

19. The apparatus of claim 16 wherein the second adaptive filter is a cross-correlation analysis filter.

20. The apparatus of claim 16, further comprising a first echo residual estimator ER(1) coupled to the integrator and a second echo residual estimator ER(2) coupled to the integrator.

21. The apparatus of claim 20 wherein the first echo residual estimator ER(1) is configured to generate a first residual echo estimation $ER_1(t)$ that includes a cross-correlation analysis between the minimum echo output $e_3(t)$ and the speaker signal x(t) and wherein the second echo residual estimator ER(2) is configured to determine a second residual echo estimation $ER_2(t)$ that includes an echo-distance mismatch between the minimum echo output $e_3(t)$ and the speaker signal x(t).

22. The apparatus of claim 21 wherein the cross-correlation analysis includes a computation of an expectation value of a cross-correlation between $e_3(t)$ and x(t).

23. The apparatus of claim 21 wherein the echo distance mismatch includes a computation of an expectation value of $\{e_3^2(t)/x^2(t)\}$.

24. The apparatus of claim 21, further comprising a residual echo cancellation module coupled to the first and second echo residual estimators, the residual echo cancellation module is configured to compute a second order norm N(1) of the first residual echo estimator ER(1) and compute a second order norm N(2) of the second residual echo estimator ER(2), the echo cancellation module be configured to apply to $e_3(t)$, during a period of double-talk, the echo residual estimator ER(1) or ER(2) for which the corresponding norm N(1) or N(2) is smaller.

25. The apparatus of claim 21, further comprising a residual echo cancellation module coupled to the first and second echo residual estimators, the residual echo cancellation module is configured to compute a second order norm N(1) of the first residual echo estimator ER(1) and compute a second order norm N(2) of the second residual echo estimator ER(2), the echo cancellation module be configured to apply to $e_3(t)$, during a period of single-talk, the echo residual estimator ER(1) or ER(2) for which the corresponding norm N(1) or N(2) is larger.

26. The apparatus of claim 21, further comprising a residual echo cancellation module coupled to the first and second echo residual estimators, the residual echo cancellation module is configured to determine a minimum residual echo estimation $ER_3(t)$, wherein the minimum residual echo estimation $ER_3(t)$ is the one of $ER_1(t)$ and $ER_2(t)$ having a minimum energy and minimum correlation to x(t).

27. The apparatus of claim 26 wherein the residual echo cancellation module is configured to selectively remove $ER_3(t)$ from the minimum echo output $e_3(t)$.

28. The apparatus of claim 27 wherein the residual echo cancellation module is configured to maximally removing $ER_3(t)$ from the microphone output during a far-end-talk only period.

29. The apparatus of claim 27 wherein the residual echo cancellation module is configured to minimally removing $ER_3(t)$ from the microphone output if the local signal s(t) has a non-zero magnitude.

30. The apparatus of claim 16 further comprising a noise cancellation module coupled to the microphone, wherein the noise cancellation module is configured to compute an estimated noise signal n'(t) from the microphone signal d(t); reduce a level of the estimated noise signal n'(t) to form a reduced noise signal n"(t); and incorporate the reduced noise signal n"(t) into a microphone output signal.

31. An audio signal processing system, comprising:
   a microphone;
   a speaker;

a processor coupled to the microphone and the speaker;

a memory coupled to the processor, the memory having embodied therein a set of processor readable instructions for implementing a method for method for echo cancellation in a system having a speaker and a microphone, the speaker receiving a speaker signal x(t), the microphone receiving a microphone signal d(t) containing a local signal s(t) and an echo signal $x_1(t)$, wherein the echo signal $x_1(t)$ is dependent on the speaker signal x(t), the processor readable instructions including:

instructions for filtering the microphone signal d(t) in parallel with a first adaptive filter and a second adaptive filter, wherein the first adaptive filter has complementary echo cancellation properties relative to the second adaptive filter;

instructions for determining a minimum echo output $e_3(t)$ from an output $e_1(t)$ of the first adaptive filter and an output $e_2(t)$ of the second adaptive filter, wherein the minimum echo output has less correlation to the speaker signal x(t); and instructions for generating a microphone output using the minimum echo output $e_3(t)$.

32. A processor readable medium having embodied therein a memory coupled to the processor, the memory having embodied therein a set of processor readable instructions for implementing a method for method for echo cancellation in a system having a speaker and a microphone, the speaker receiving a speaker signal x(t), the microphone receiving a microphone signal d(t) containing a local signal s(t) and an echo signal $x_1(t)$, wherein the echo signal $x_1(t)$ is dependent on the speaker signal x(t), the processor readable instructions including:

instructions for filtering the microphone signal d(t) in parallel with a adaptive filter and a second adaptive filter, wherein the first adaptive filter has complementary echo cancellation properties relative to the second adaptive filter;

instructions for determining a minimum echo output $e_3(t)$ from an output $e_1(t)$ of the first adaptive filter and an output $e_2(t)$ of the second adaptive filter, wherein the minimum echo output has less correlation to the speaker signal x(t); and instructions for generating a microphone output using the minimum echo output $e_3(t)$.

* * * * *